C. W. SALADEE.
Improvement in the Manufacture of Torsion Springs.
No. 124,013.  Patented Feb. 27, 1872.
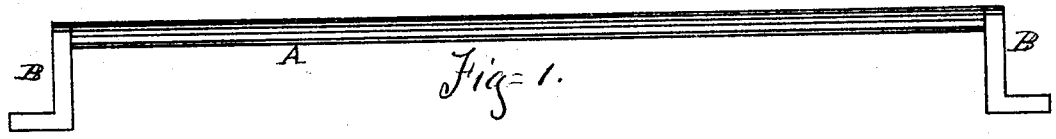
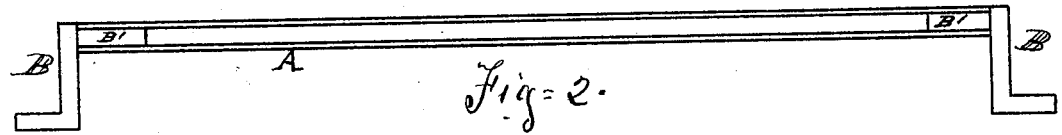

124,013

UNITED STATES PATENT OFFICE.

CYRUS W. SALADEE, OF ST. CATHARINE'S, CANADA, ASSIGNOR TO HIMSELF AND L. DOBBINS, OF ERIE, PENNSYLVANIA.

IMPROVEMENT IN THE MANUFACTURE OF TORSION-SPRINGS.

Specification forming part of Letters Patent No. 124,013, dated February 27, 1872.

SPECIFICATION.

Be it known that I, CYRUS W. SALADEE, of St. Catharine's, in the Dominion of Canada, have invented a Tubular Torsion-Spring, of which the following is a specification embodying my invention.

The nature of my invention consists in the construction of torsion-springs from hollow welded steel tubing of requisite dimension and of any desired form, by welding or otherwise securely fastening the cranks or arms B in the ends of said tubes.

From experiments which I have made in the manufacture and use of solid torsion-springs under five several grants of Letters Patent issued to me, as well as from my observation of the experiments of other parties engaged in the manufacture of this class of springs, I have discovered that our failures to render the torsion-springs a complete success lay in the fact of forming them out of solid bars of round steel. It is self-evident, upon a moment's reflection, that it is mainly the outside surface or shell of the round bar of steel that is brought into requisition on the principle of the torsion-spring, and that that portion of the metal around its immediate center retards the free torsional action of the steel upon the outer surfaces; but substitute for the solid bar or rod a hollow steel tube of like diameter and every particle of the steel is brought into active requisition, besides rendering it stronger and lighter.

In the drawing, Figure 1 represents a tubular torsion-spring having the cranks welded into the ends of the tube A. Fig. 2 is the same, but with the tube A in section, and showing the parts B' of the cranks B in the tube, and in which position the ends of the tube are welded thereto; or this connection might be made by the use of a screw-thread. But since I do not limit my claim to any particular form of tubular torsion-spring I deem it unnecessary to further show or describe the numerous modifications of form and application of which it is susceptible.

I claim as my invention—

The construction of torsion-springs of welded steel tubes, by welding or otherwise securely fastening the cranks or arms B in the ends of said tubes, substantially as and for the purpose set forth.

CYRUS W. SALADEE.

Witnesses:
WM. HURLEY,
EDM. F. BROWN.